5792X
No Printed Specification Available
J. Hurd.
Cloth Drying Mach.
Patented Jan. 23, 1830.
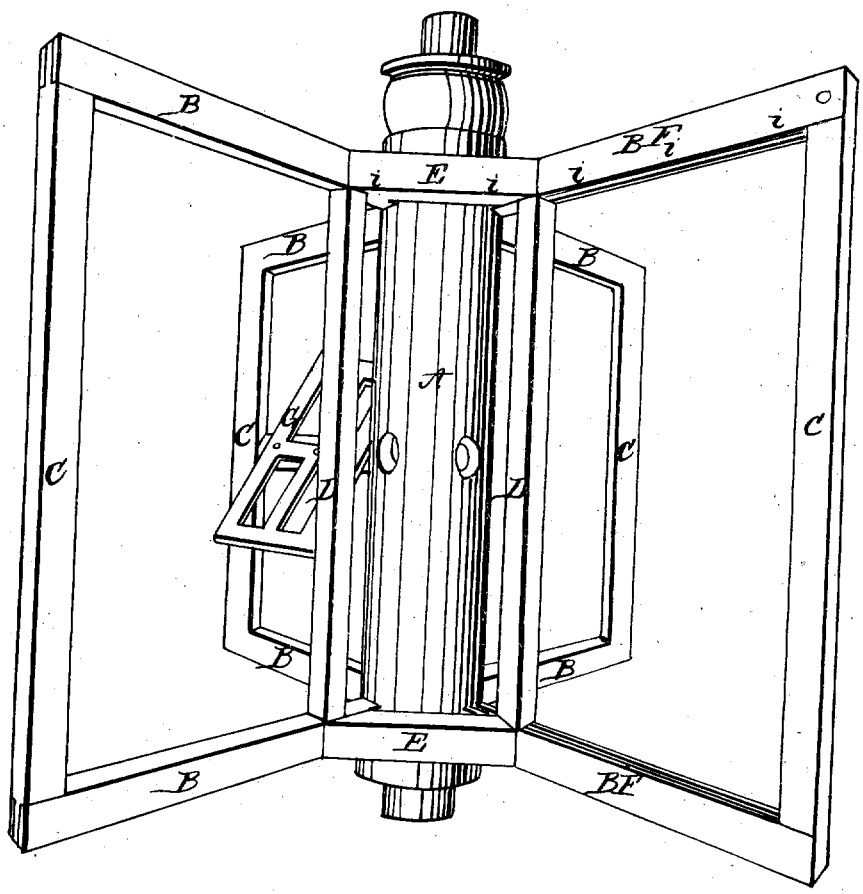
N. PETERS, PHOTO-LITHOGRAPHER, WASHINGTON, D. C.

Joseph Hurd, Jun.r – Letters Patent, Dated Jan 23. 1830.

The Schedule referred to in these Letters Patent, and making part of the same, con-
-taining a description in the words of the said Joseph Hurd, Jun.r himself of his
improvement in the mode of evaporating fluids, and drying cloths, wool, silks,
paper &c by means of which evaporation proceeds at all times, without assistance
from the heat, called an Evaporating Shaft.

To all persons to whom these presents shall come, Joseph Hurd Jun.r of Boston,
in the County of Suffolk and State of Massachusetts, gentleman sends greeting
Be it known that I the said Joseph Hurd, Jun.r have made and applied to use,
a new and useful improvement in the mode of evaporating fluids, and drying cloths, wool
silk, paper &c, by means of which evaporation proceeds rapidly, at all times without
assistance from heat, called an evaporating shaft My improvement consists in giving motion to the objects from which water or
moisture is to be expelled in the manner following Have an upright shaft, see Drawing, letters a, a, a, with arms b, b, b, b, projecting
from top and bottom. The upper and lower arms may be connected at their extremities
by the pieces c, c, c, and also nigh the shaft, by pieces d, d, d. – Also pieces e, e, e, connecting
upper arms together and lower arms together. A frame will thus be formed, to which
should be attached whatever is to be dried. The shaft is then to be put in motion
by water or other power. – The evaporation will increase in proportion to the
velocity of the motion. When the motion is very rapid, the effect is not merely
evaporation, but water is sensibly thrown out of the cloth by centrifugal force.

The shaft may be prepared for drying and tentering cloth in the following man-
-ner viz. Let there be four arms above and below connected together by c, c, c, d, d, d,
e, e, e. Each of these arms should be double, or composed of 2 [illegible] 3, or 4 inches apart,
[illegible] b, f, b, f that air may pass freely between the folds of cloth, which will be
tentered on each side of the arms, and on the connecting pieces e, e, e, Tenter hooks
i, i, i, i, may be set all around the frame. The lower moveable tenter bars may be [illegible]
to the upright pieces, c, c, d, d, and the cloth stretched as on common tenter bars
The number of arms may be encreased and thus admit a greater length of
cloth. The shaft may be high enough to admit several breadths. Cotton cloth
may be drawn around the frame in the manner of the woolen cloth, and

1/23/1830 5792X secured in place at the cross piece c, c, by moveable bars or rods, or some more conve=
=nient mode.

There may be frames of open work, g, g, g, attached to the shaft to secure wool which may have net work to keep it in the place. The arrangement of the arms and frame of the Shaft may be varied so as to suit the convenience of all who use it. It is useless to attempt a description of the numerous variations of which the arms are susceptible It may be used with great effect in evaporating salt water for the purpose of making salt. The water may be thrown into a basin, on the top of the Shaft, having holes in its bottom, through which the water might drop, and trickle down ropes, boards, ^cloths^ or anything more suitable, which should be suspended over or connected with the upper and lower parts of the Shaft. Other liquids might also be evaporated in this way for the purpose of making sugar &c The Shaft may be placed horizontally, or inclining to the horizon if more con=
=venient.

This motion on a revolving shaft has an advantage over other descriptions of motions in throwing off the vapour with some velocity, by centrifugal force- In testimony that the above is a true specification of my said improvement as above described, I have ^hereto^ set my hand and seal this eleventh day of January in the year of our Lord one thousand eight hundred and thirty.

Joseph Hurd Jun.

Witnesses
A. W. Paine
S. D. Ward

Recorded
John D. Craig
Superintendent
Patent office 26th January 1830.

Exd
W. C.

(736 words)